March 15, 1966  J. V. KITRELL  3,239,872
CASTER-WHEEL ELEVATOR MECHANISM
Filed April 8, 1963  2 Sheets-Sheet 1

INVENTOR.
JOHN V. KITRELL
BY
Wm. H. Dean

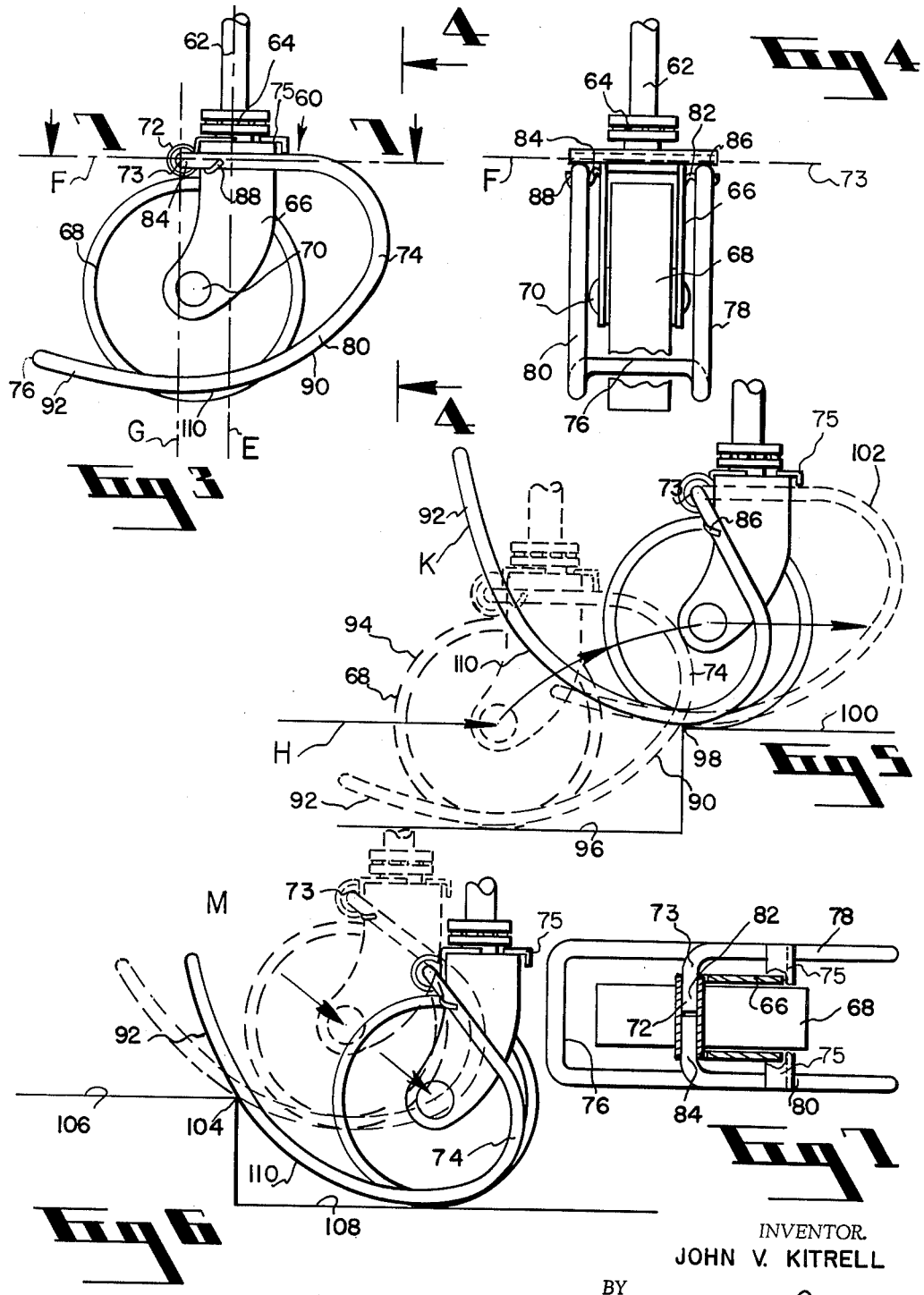

United States Patent Office 3,239,872
Patented Mar. 15, 1966

3,239,872
CASTER-WHEEL ELEVATOR MECHANISM
John V. Kitrell, Lincoln, Nebr., assignor to Lincoln Carriage Corporation, Maricopa, Ariz., a corporation of Arizona
Filed Apr. 8, 1963, Ser. No. 271,435
7 Claims. (Cl. 16—18)

This invention relates to a wheel elevator mechanism and more particularly to an elevator mechanism which may be used in connection with casters or other wheels disposed to roll on a horizontal surface and to pass over obstructions on such surfaces, which obstructions may be in the form of steps, stairs, blocks, or the like, both above or below the normal level of the horizontal surface.

This application is a continuation-in-part of my abandoned application for Wheel Elevator Mechanism, Serial No. 230,104, filed October 12, 1962.

Heretofore, various casters and wheels have been employed on horizontal surfaces to support wheel chairs or other vehicles and there has been a problem related to the elevation of such wheels to roll upon or off from articles or obstructions extending above the normal level of the surface on which said wheels or casters normally operate.

It has been a problem to roll casters upwardly or downwardly over the edge or tread of steps due to the fact that such casters are often of a short radius and may be equal or less in radius than the elevation of a step thereby causing jarring when the caster rolls up or down over the edge of an obstacle or series of obstacles. Such shocks are quite objectionable in connection with wheel chairs or other vehicles requiring gentle handling of patients or other cargo.

When a wheel or caster is rolled over a block or other obstruction, such as a step extending above the normal level of the floor on which the caster or wheel rotates, considerable resistance to the horizontal or forward movement of the wheel over the obstruction may be encountered and this resistance increases to infinity when the elevation of the obstruction reaches the axis of the wheel or caster.

This difficulty has been particularly objectionable in the operation of wheel chairs, for example, where it is often necessary to operate a wheel chair over elevated objects on a floor surface and where it is desired to attain relative smooth operation of the wheel chair so that the patient carried thereon is not unduly agitated.

Accordingly, it is an object of the present invention to provide a wheel elevator mechanism which may be utilized in connection with casters or wheels for the purpose of readily elevating such a wheel or caster over an obstruction extending above the normal surface on which the wheel or caster rolls.

Another object of the invention is to provide a very simple wheel elevator mechanism which comprises a shoe structure pivoted above the rotating axis of a wheel; said shoe having a portion normally disposed considerably above the periphery of said wheel and the surface on which said wheel rotates whereby the surface of the shoe may engage an obstruction and pivot about its axis which is disposed above the pivotal axis of the wheel and thereby raise the wheel to a level almost coinciding with the lower peripheral portion of the wheel.

Another object of the invention is to provide a wheel elevator mechanism comprising a shoe pivoted substantially above the pivotal axis of a respective wheel; said shoe comprising an obstruction-engaging portion which, when pivoted downwardly, is in close proximity to the periphery of the wheel which engages a floor or other surface on which the wheel is supported.

Another object of the invention is to provide a wheel elevating mechanism comprising a pivoted shoe having its axis substantially above the respective wheel and having an engaging portion held by resilient means in elevated position forwardly of the wheel to engage obstructions approached by the wheel; said engaging portion, when pivoted downwardly against force of said resilient means, closely approximates an elevation at which the periphery of the wheel is engaged on a supporting surface.

Another object of the invention is to provide a novel wheel elevator mechanism which is automatically operable to elevate wheels over obstructions on horizontal surfaces; said mechanism being adaptable for use in connection with various wheels, casters, and wheel structures on a great variety of vehicles.

Another object of the invention is to provide a novel wheel elevator mechanism particularly adapted to a caster mechanism and wherein a pivoted shoe is pivotally connected to the caster mechanism above the wheel axis thereof and rearwardly of the vertical pivotal axis of the caster whereby the shoe, when engaging an elevated object over which the caster must be elevated, automatically aligns the wheel normal to the edge of the obstruction by pivoting the caster around its vertical axis into such alignment.

Another object of the invention is to provide a novel wheel elevator mechanism for use in connection with casters which automatically operates to elevate or lower the caster relative to elevated structures normally above the surface on which the caster operates whereby the caster may be smoothly elevated upwardly or lowered downwardly relative to precipitous structures whereby smooth operation of the caster may be attained in either upward or downward movements relative to such structures on which the caster operates.

Another object of the invention is to provide a novel wheel elevator mechanism particularly adapted to installation on casters and wherein a single loop structure is pivotally mounted to a caster above a wheel axis thereof and normally rearwardly of the vertical pivotal axis of the caster and wherein such mechanism extends forwardly and rearwardly of the wheel axis to serve both in elevating the caster upwardly over precipitous obstructions and also to lower said caster downwardly over precipitous structures.

Further objects and advantages of the invention may be apparent from the following specification, appended claims, and accompanying drawings, in which:

FIG. 3 is a side elevational view of a modified wheel elevator mechanism of the invention showing it applied to a caster and illustrating such modification adapted to elevate and/or lower the caster relative to precipitous obstructions normally above or below the usual level on which the caster is adapted to roll;

FIG. 4 is an elevational view of the modified structure taken from the line 4—4 of FIG. 3;

FIG. 5 is a side elevational view similar to that shown in FIG. 3 but showing the wheel elevator mechanism of the invention operating to elevate a caster upwardly and over a precipitous obstruction normally above the level on which the caster operates;

FIG. 6 is a view similar to FIG. 5 but showing the modified construction of the invention disclosed in FIG. 3 in positions wherein the elevator mechanism of the invention lowers the caster smoothly downwardly and over a precipitous obstruction; and FIG. 7 is a plan sectional view taken on the line 7—7 of FIG. 3.

Figure 1:
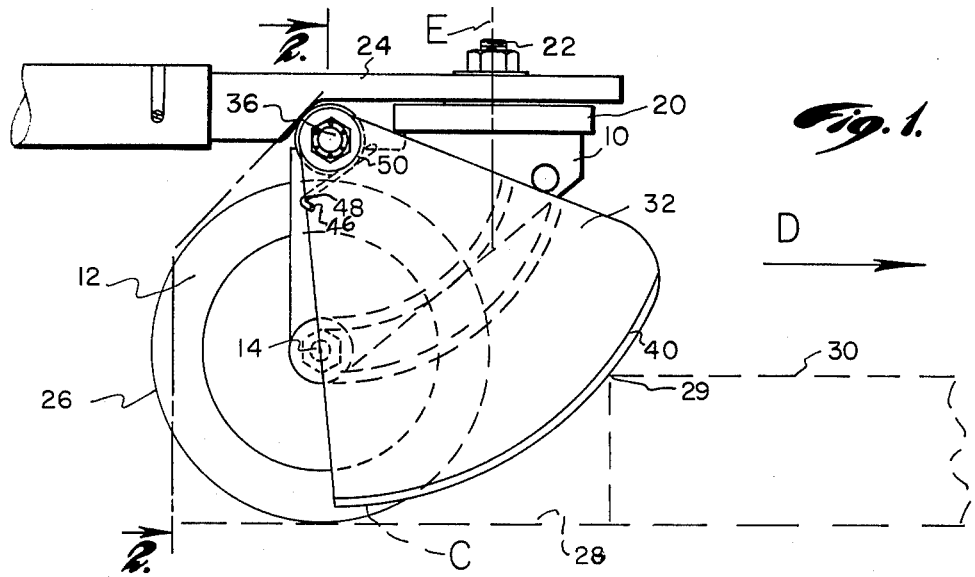
FIG. 1 is a side elevational view of a caster mechanism having a wheel elevator mechanism in accordance with the present invention, in connection therewith.
Figure 2:
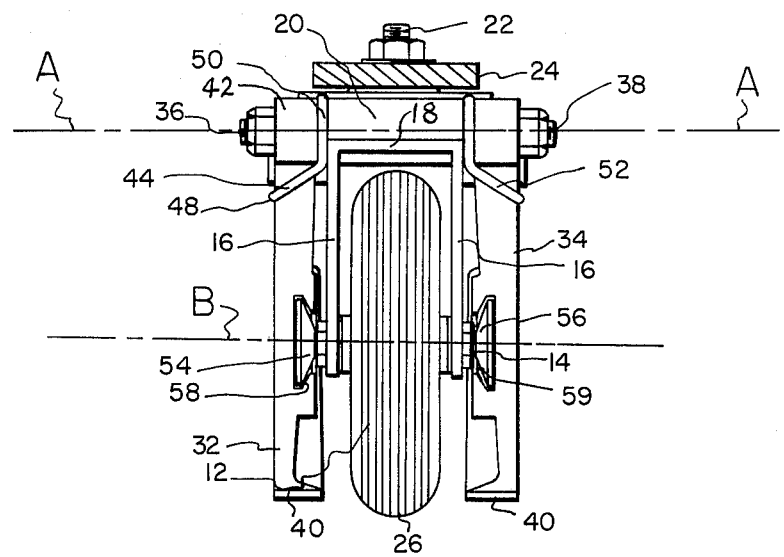
FIG. 2 is an enlarged sectional view taken from the line 2—2 of FIG. 1.

As shown in FIG. 1 of the drawings, the wheel elevator mechanism of the invention is applied to a caster 10. This caster 10 is provided with a conventional wheel 12 having an axle 14 about which it rotates. The axle 14 is mounted in a conventional offset caster fork structure 16 which is bifurcated, as shown in FIG. 2 of the drawings.

The fork structure 16 is provided with an intermediate portion 18 engaged with a conventional rotary thrust bearing 20 having a vertical bolt 22 connecting the fork structure 16, the thrust bearing 20 and an arm 24 with which the caster structure is connected. This arm 24 may be a portion of a wheel chair or any other vehicle, supported by the caster 10. It will be seen that the fork structure 16 of the caster 10 is rotatable about the vertical axis of the bolt 22 and the bearing 20 and that the thrust bearing may be a conventional ball bearing caster structure.

The wheel 12 at its periphery 26 is disposed to roll on an upper surface 28 of the floor or the ground and the wheel elevating mechanism of the invention is adapted to elevate the wheel 12 automatically to pass over a corner 29 of an obstruction 30 disposed on the surface 28.

The wheel elevator mechanism of the invention comprises a pair of elevating shoes 32 and 34 pivotally mounted on trunnions 36 and 38, respectively, secured to the fork structure 16 of the caster 10. These trunnions 36, 38 form pivotal axes for the shoes 32 and 34. These trunnions 38 are axially horizontal and the axes of the trunnions 36 and 38, as indicated by a broken line A, are considerably above the axis indicated by a broken line B, which passes through the axle 14 of the caster wheel 12.

Inasmuch as the shoes 32 and 34 are similar and on opposite sides of the wheel, only the shoe 32 will be hereinafter described.

This shoe 32 being pivotally mounted on the trunnion 36 is provided with arcuate obstruction-engaging portion 40 disposed to engage a corner 29 of an obstruction 30, as hereinbefore described. This engaging portion 40 is disposed to pivot about the axis A of the trunnion 36 and the engaging shoe portion 40 is arcuate and substantially concentric about said axis A, as shown best in FIG. 1 of the drawings.

When the engaging portion 40 is pivoted into adjacent position with the periphery 26 of the wheel 12, it is in close proximity thereto, as indicated at C, in FIG. 1 of the drawings. Thus, the disposition of the axis A of the trunnion 36 being substantially above the axis of the axle 14, provides a longer lever upon which to pivot over the obstruction 30 and thus raise the periphery 26 of the wheel 12 into close proximity to the upper surface of the obstruction 30, as shown in FIG. 1 of the drawings. Thus, the ratio of the elevation of the obstruction 30 above the periphery of the wheel 12 relative to its radius is greatly reduced by action of the shoe 32, as shown in FIG. 1 of the drawings.

The shoe 32 is provided with a bearing hub 42 mounted on the trunnion 36 and wound around this trunnion 36 is a spring 44 which has one end 46 engaging an edge 48 of the shoe 32. The opposite end 50 of the spring 44 engages in a lower side portion of the thrust bearing 20, all as shown best in FIGS. 1 and 2 of the drawings. Thus, the spring 44 tends to hold the shoe 32 outward in a forward and elevated position relative to the wheel 12 so that it may readily engage a corner 29 of an obstruction 30 and act as an elevating mechanism when force is applied to the vehicle in the direction of an arrow D, shown in FIG. 1 of the drawings.

The shoe 34 is provided with a spring 52 similar to the spring 44 engaging the shoe 32 in order to hold said shoe 34 forwardly in the position as shown in FIG. 1 of the drawings.

It will be appreciated that the shoes 32 and 34 are disposed on a longer radius than that of the wheel 12 and thus, more readily and more easily step over obstructions on the surface 29 and thereby elevate the wheel 12 to a position in which the remaining elevation of the obstruction is small with relationship or in proportion to the radius of the wheel. Thus, an obstruction 30 which equals a substantial part or proportion of the radius of the wheel 12 may be minimized by action of the longer radius shoes 32 and 34.

It will be appreciated that the present invention thus facilitates elevation of the wheels 12 over obstructions on the surface 29 and that the invention thus provides for smooth negotiation of relatively great obstructions in proportion to the radius of the wheel 12.

It will be seen that the pivotal axis 36 of the shoes 32 and 34 is rearward of a vertical axis E of the bolt 22 so that when the peripheral portions 40 of the shoes 32 and 34 contact a corner of an obstruction 30, the force applied by the shoes to the axle 36 will cause the caster to swivel about its vertical axis E into alignment with the obstruction 30.

As shown in FIG. 2 of the drawings, opposite ends of the wheel axle 14 are provided with frusto-conical discs 54 and 56 which are engaged by conforming arcuate slotted portions 58 and 59, the arcuate structure of these slots 58 and 59 being concentric with the axis of the axle 36. Thus, the frusto-conical portions 54 and 56 in the arcuate slotted portions 58 and 59 of the shoes 32 and 34, respectively, brace the shoes 32 and 34 against lateral loading thereby preventing these shoes from becoming bent or damaged when the caster, as disclosed, is used in connection with heavy equipment and when an irregular obstruction is engaged tending to impose lateral loading on either of the shoes 32 or 34.

In a modification of the present invention, as shown in FIGS. 3 and 4, a conventional caster mechanism 60 is provided with a normally vertical axis shaft 62, about which a load carrying bearing 64 is mounted. This bearing resists loading of the conventional caster fork 66 in a vertical direction and provides for free pivotal action of the fork 66, about the normally vertical axis of the shaft 62. It will be understood that the shaft 62, bearing 64, and fork 66 are conventional caster structures.

A conventional wheel 68 is rotatably mounted on a pin 70, extending through the fork 66 so that the wheel 68 is rotatably mounted in the fork structure 66.

Fixed to the fork structure 66 is a bearing 72 having a substantially horizontal axis 73 disposed at a level, as indicated by a broken line F in FIGS. 3 and 4 of the drawings. This axis 73 is parallel to the axis of rotation of of caster wheel shaft 70 and is disposed rearwardly of the vertical axis E of the shaft 62. The rearward spacing of the axis 73 of the bearing 72 is indicated by a vertical line G passing vertically through the axis 73 at right angles thereto. Thus, the pivotal bearing 72 is disposed normally rearwardly of the vertical axis E and the axis of the wheel shaft 70 is also rearwardly of the axis of swivel E so that normal caster operation is attained. The rearward disposition of the axis 73, as indicated by line G, provides pivotal mounting on a horizontal axis of an obstruction-engaging shoe 74 which operates in a similar manner to the shoes 32 and 34, hereinbefore described. It will be appreciated that the axis 73 of the bearing 72 is rearward of the vertical axis E which corresponds to the vertical axis E, shown in FIG. 1 of the drawings, the shaft 36 as shown in FIG. 1, corresponding to the shaft bearing 72, shown in FIG. 3.

The construction of the obstruction-engaging member 74 differs from that of the shoes 32 and 34, hereinbefore described. The member 74 is a single wire loop member having a middle portion 76 forming a trailing end of the obstruction-engaging member. Integral with this middle portion are side portions 78 and 80 which are provided with opposite ends 82 and 84 having portions formed at right angles thereto and inserted in the bearing member 72; thus, opposite ends of the member 74 are opposed to each other and pivotally mounted in the cylindrical bearing 72. This cylindrical bearing 72 being mounted above the wheel 68 is preferably made of sheet metal or the like, and may be integral with the fork structure 66 or may be fused or otherwise secured thereto.

Engaging this bearing member 72 are spring members 86 and 88 which balance the obstruction-engaging member 74 to hold it upward against a stop 75, substantially in the position, as shown in FIG. 3 of the drawings. In this position portions 90 of the side portions 78 and 80 form leading portions forwardly of the axis E, while portions 92 of the side portions 78 and 80 form trailing portions rearwardly of the axis E and rearwardly of the periphery of the wheel 68. The leading portions 90 are disposed to engage elevated obstructions and to raise the caster wheel 68 upwardly thereover while the trailing portions 92 are disposed to engage precipitous structure to lower the caster wheel 68 downwardly over such structure.

Reference is made to FIG. 5, wherein a broken line illustration 94 indicates the invention operating on a surface 96, on which the wheel 68 normally rolls. In this position, the leading portion 90 of the side portions 78 and 80 engage a corner 98 of an elevated precipitous structure. Under these conditions, as the caster moves forward in the direction of the arrow H, the leading edge portions 90 engage the corner 98 and the obstruction-engaging member 74 then pivots about the axis of the bearing member 72 against compression of the springs 86 and 88, and the trailing portions 92 of the member 74 are pivoted upwardly to a position K, all as indicated best in FIG. 5 of the drawings. At this time, the caster wheel has reached an elevated surface 100 and the obstruction-engaging member 74 is then moved forwardly into a balanced position 102 by means of the springs 86 and 88.

As shown in FIG. 6 of the drawings, the caster mechanism of the invention is illustrated passing downwardly over an abrupt precipice or declivity in the direction of arrow M and in this position, trailing portions 92 of the member 74 engage an edge 104 of the abrupt declivity on a precipitous structure to lower the caster gently from a surface 106 to a surface 108. Thus, the wheel normally rolls on the surface 106 and is lowered gently by the trailing portions 92 of the obstruction-engaging member 74 downwardly onto the surface 108, thereby preventing impact of shock as the caster wheel proceeds from the surface 106 to the surface 108. Actually, the action simulates the operation of a larger wheel which would extend on a radius from the axis E to the arcuate portions of the side members 78 and 80 which have portions 110 which are substantially disposed on a radius centering around the axis 73 of the bearing 72. Thus, the member 74 is capable of elevating or lowering the caster wheel 68 relative to precipitous obstructions and declivities and the interconnecting middle portion 76 of engaging member 74 integrally holds the side portions 78 and 80 together so that their opposite ends 82 are held in the bearing member 72.

It will be obvious to those skilled in the art that the wheel elevating and lowering mechanism of the invention comprising the shoes 32 and 34, or one of them, depending upon the use of the invention, may be applied to various vehicles adjacent wheels thereof, as for example, the present invention, as shown in relation to a caster structure. However, the same general type of mechanism may be used in connection with wheels having fixed axles.

It will be obvious to those skilled in the art that various modifications of the present invention may be resorted to in a manner limited only by a just interpretation of the following claims.

I claim:
1. In a wheel elevator mechanism the combination of: a wheel having an axle and a peripheral surface; said peripheral surface being adapted to roll on a supporting surface; means supported on said axle; and an elevating shoe pivotally mounted on said means above said axle; a shoe portion of said shoe projecting forwardly and above a peripheral portion of said wheel engageable on a surface supporting it; said shoe pivoted to move its shoe portion into close proximity and to a position slightly above the peripheral portion of said wheel supported on said surface; said means comprising a caster fork structure; said shoe pivoted on said caster fork structure above said axle.

2. In a wheel elevator mechanism the combination of: a wheel having an axle and a peripheral surface, said peripheral portion of said wheel engageable on a surface means supported on said axle; and an elevating shoe pivotally mounted on said means above said axle; a shoe portion of said shoe projecting forwardly and above a peripheral portion of said wheel engageable on a surface supporting it; said shoe pivoted to move its shoe portion into close proximity and to a position slightly above the peripheral portion of said wheel supported on said surface; said means comprising a caster fork structure; said shoe pivoted on said caster fork structure above said axle; said shoe portion being arcuate and substantially concentric with its pivotal mounting on said fork structure.

3. In a wheel elevator mechanism the combination of: a wheel having an axle and a peripheral surface; said peripheral surface adapted to roll on a supporting surface; a caster fork structure supported on said axles; and an elevating shoe pivotally mounted on said caster fork structure above said axle; a shoe portion of said shoe projecting forwardly and rearwardly and above a peripheral portion of said wheel, engageable with a surface supporting it; said shoe pivoted to move its shoe portion into close proximity and to a position slightly above the peripheral portion of said wheel supported on said surface.

4. In a wheel elevator mechanism the combination of: a wheel disposed to operate on a supporting surface; an axle for said wheel; caster means supported on said axle; a substantially vertical axis pivot structure for said caster; an obstruction-engaging member pivoted on said caster above said axle and rearwardly of the axis of said vertical axis pivot structure; said obstruction-engaging member being pivoted on said caster means and having a curved-engaging portion disposed to pivot downwardly into closed proximity with the peripheral portion of said wheel at said supporting surface; said obstruction-engaging member at its curved surface extending forwardly and above said wheel.

5. In a wheel elevator mechanism the combination of: a wheel disposed to operate on a supporting surface; an axle for said wheel; caster means supported on said axle; a substantially vertical axis pivot structure for said caster; an obstruction-engaging member pivoted on said caster above said axle and rearwardly of the axis of said vertical axis pivot structure; said obstruction-engaging member being pivoted on said caster means and having a curved-engaging portion disposed to pivot downwardly into close proximity with the peripheral portion of said wheel at said supporting surface; said obstruction-engaging member at its curved surface extending forwardly and above said wheel; said curved portion of said obstruction-engaging member extending rearwardly and upwardly relative to said wheel.

6. In a wheel elevator mechanism the combination of: a wheel disposed to operate on a supporting surface; an axle for said wheel; caster means supported on said axle; a substantially vertical axis pivot structure for said caster; an obstruction-engaging member pivoted on said caster above said axle and rearwardly of the axis of said vertical axis pivot structure; said obstruction-engaging member being pivoted on said caster means and having a curved-engaging portion disposed to pivot downwardly into close proximity with the periphery of said wheel at said supporting surface, said obstruction-engaging member at its curved surface extending forwardly and above said wheel; said curved portion of said obstruction-engaging member extending rearwardly and upwardly relative to said wheel; resilient balance means disposed to hold said obstruction-engaging member in position so that said curved portions are disposed above the lower portion of said wheel and forwardly and rearwardly thereof.

7. In a wheel elevator mechanism the combination of: a wheel disposed to operate on a supporting surface; an axle for said wheel; caster means supported on said axle; a substantially vertical axle pivot structure for said caster; an obstruction-engaging member pivoted on said caster above said axle and rearwardly of the axis of said vertical axis pivot structure; said obstruction-engaging member being pivoted on said caster means and having a curved-engaging portion disposed to pivot downwardly into close proximity with the periphery of said wheel at said supporting surface; said obstruction-engaging member at its curved surface extending forwardly and above said wheel; said obstruction-engaging member having a middle portion normally disposed rearwardly of said wheel; side portions coupled to said middle portion and disposed at opposite sides of said wheel; bearing portions of said obstruction-engaging member having horizontal axis portions; and bearing means mounted on said caster means to provide a pivotal mounting for the bearing portions of said obstruction-engaging member at said pivotal mounting of said obstruction-engaging member on said caster means.

References Cited by the Examiner

UNITED STATES PATENTS 2,123,707   7/1938   Bloch.

FOREIGN PATENTS 901,736   1/1954   Germany.
185,067   8/1922   Great Britain.
60,392   12/1947   Netherlands.
223,517   4/1943   Switzerland.

BENJAMIN HERSH, *Primary Examiner.*

LEO FRIAGLIA, A. HARRY LEVY, *Examiners.*